A. PICK.
EARTH DRILLING MACHINE.
APPLICATION FILED NOV. 10, 1914.

1,196,480.

Patented Aug. 29, 1916.
6 SHEETS—SHEET 2.

WITNESSES

INVENTOR
Alfred Pick
BY
E. W. Marshall
ATTORNEY

A. PICK.
EARTH DRILLING MACHINE.
APPLICATION FILED NOV. 10, 1914.

1,196,480.

Patented Aug. 29, 1916.
6 SHEETS—SHEET 3.

WITNESSES

INVENTOR
Alfred Pick
BY
E. W. Marshall
ATTORNEY

A. PICK.
EARTH DRILLING MACHINE.
APPLICATION FILED NOV. 10, 1914.

1,196,480.

Patented Aug. 29, 1916.
6 SHEETS—SHEET 4.

WITNESSES

INVENTOR
Alfred Pick
BY
E. W. Marshall
ATTORNEY

A. PICK.
EARTH DRILLING MACHINE.
APPLICATION FILED NOV. 10, 1914.

1,196,480.

Patented Aug. 29, 1916.
6 SHEETS—SHEET 5.

A. PICK.
EARTH DRILLING MACHINE.
APPLICATION FILED NOV. 10, 1914.

Patented Aug. 29, 1916.
6 SHEETS—SHEET 6.

UNITED STATES PATENT OFFICE.

ALFRED PICK, OF NEW YORK, N. Y.

EARTH-DRILLING MACHINE.

1,196,480.　　　　　　　Specification of Letters Patent.　　Patented Aug. 29, 1916.

Application filed November 10, 1914. Serial No. 871,220.

*To all whom it may concern:*

Be it known that I, ALFRED PICK, a subject of the Crown of Austria-Hungary, and a resident of New York, county of New York, and State of New York, United States of America, have invented certain new and useful Improvements in Earth-Drilling Machines, of which the following is a specification, reference being had to the accompanying drawings, forming a part thereof.

My invention pertains to the art of earth drilling and has special reference to apparatus adapted for drilling oil wells, gas wells, test holes and the like.

One object of my invention is to provide a powerful and compact drilling machine arranged for self-propulsion so that it may be conveyed from one field to another.

Another object is to provide a motor vehicle that shall be equipped with earth drilling machinery, and means for connecting the vehicle motor to operate the drilling machinery.

Another object is to provide a collapsible mast for a portable machine of the aforesaid character forming an integral part of the drilling machine.

Still another object is to provide for the ready manipulation of the mast and its equipment, for the steady support of the vehicle when the engine is operating the drill, and for not only supporting the telescopic mast upon the vehicle, but also for partially supporting the vehicle upon the mast when the mast is extended and mounted in position for drilling.

The objects and advantages of my invention will be more specifically set forth hereinafter, and in order that my invention may be thoroughly understood, I will now proceed to describe the same in the following specification and then point out the novel features thereof in appended claims.

Referring to the drawings: Fig. 14 shows the hand winch and its attachments at the forward end of the vehicle. Fig. 15 is a sectional elevation on the line 15—15 of Fig. 14, and Fig. 16 is a side elevation of the same parts. A sectional detail of one of the tower hoisting drums is shown in Fig. 17.

The specific structure set forth in the drawings is intended merely to be illustrative of one embodiment of my invention and it is obvious that other structures may be produced within the spirit and scope of my invention and I intend that only such limitations be imposed as are indicated in the appended claims.

Before specifically describing the structure illustrated, with reference to the drawings, its general construction and purpose may be outlined as follows: The machine embodies a motor vehicle on which the drilling machinery is compactly mounted and which is adapted to be used either as a vehicle or as a drilling machine. It is complete and effectively operative for earth drilling when it is suitably set in position with the telescopic mast extended. It comprises in general a motor truck having a longitudinal shaft, a transverse vehicle driving shaft suitably coupled thereto, an internal combustion engine arranged to drive the longitudinal shaft and located at the rear, a positive toggle-actuated friction clutch adjacent to the engine, transmission gears, a drilling crank at the front of the vehicle, a bull wheel and sand line reel operatively connected to the drilling crank shaft, and a collapsible mast pivotally mounted on the vehicle frame. A jaw clutch is arranged to couple the drilling crank shaft to the motor shaft, and an independent jaw clutch is interposed between the drilling crank shaft and the bull wheel. The sand line reel is controlled by a shifting idler gear. A service brake is provided to control the vehicle as well as the machinery and emergency or lock brakes are provided for the bull wheel and sand line reel. Transmission and differential gearing is interposed between the engine and the driving shaft, the differential is provided with a means for locking the differential at will.

The mast is composed of a plurality of sections and is pivotally mounted on a pair of arms which extend upwardly from the frame of the vehicle near the forward end. When in use the mast is extended and supports the forward end of the vehicle, the rear of the vehicle being elevated so that the cables from the bull wheel and sand line reel may extend at right angles to the axes of the reels, onto sheaves which are provided near the top of the mast. The arrangement of the machinery in the position for drilling is clearly shown in Fig. 1. The vehicle frame is securely attached to the mast and the arrangement is such that when the machine is operating and drilling, the vehicle is maintained in a statonary position, one end resting on the mast, the other on suitable supports, so that stability of the machine is insured. Furthermore, the weight of the vehicle assists materially in holding the mast securely to the ground and in position, it being also secured by suitable guy wires.

Like characters of reference designate corresponding parts in all the figures.

In the drawings, 20 designates a vehicle frame, 21 the wheels, 22 the motor and attachments which are at the rear of the vehicle, 23 a steering wheel and 24 a fuel tank. The motor has a main longitudinal shaft 25 which is connected through a positive friction clutch 26 to a longitudinal shaft 27. This shaft is operatively connected by suitable transmission gears (not shown) inclosed in a transmission case 28, to a two-section transverse shaft 29 having removable pinions 30 at its respective ends. When the vehicle is being propelled from one field to another these pinions are in mesh with gear wheels 30ª having sprockets 31ª which are coupled to the rear wheels 21 by chains 31.

Figures 1, 18:
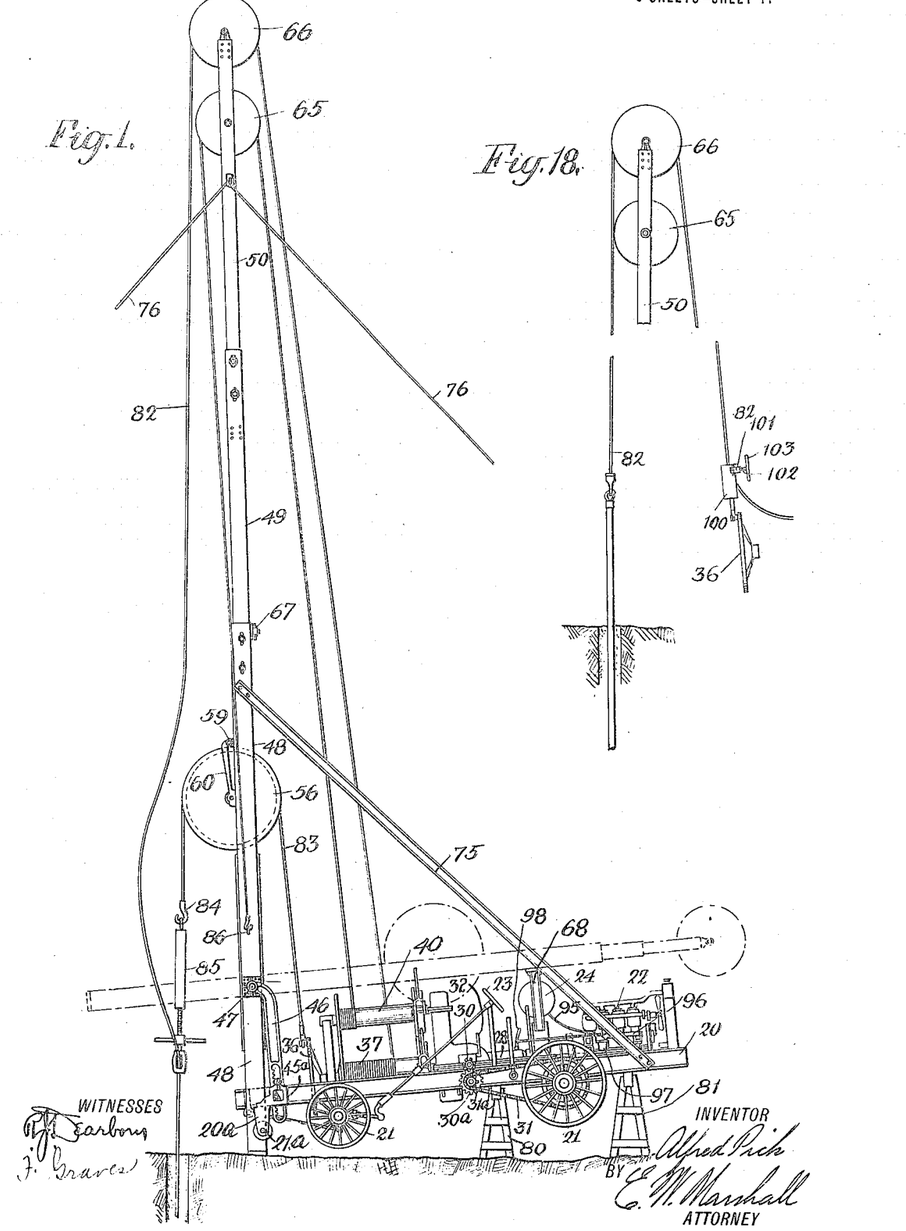
Figure 1 is a side elevation of a drilling apparatus arranged and constructed in accordance with my invention and set in position for drilling with the mast fully extended.
Fig. 18 is an elevation showing the "spudding" attachment in detail.

When the apparatus is used for drilling and is set in position as shown in Fig. 1, the pinions 30 are removed (being replaced by small hoisting drums 31ᵇ as hereinafter set forth), and the shaft 29 is connected by a jaw clutch 32 and beveled gears 33 to a longitudinal shaft 34 which is coaxial with the shafts 25 and 27 and extends to the front of the vehicle, being supported in suitable bearings 35.

36 designates the drilling crank which is secured to the front end of the shaft 34, and 37 is a bull wheel which is rotatably mounted on the shaft 34 between the bearings 35 and may be operatively connected thereto by a clutch 38. Mounted above and a little to one side of the bull wheel is a shaft 39, on which a sand line reel 40 is rotatably mounted. The shaft is mounted in bearings 41 and is operatively connected to the shaft 34 by gears 42—43—44, a handle 45 being arranged to throw the idler gear 43 out of mesh with the gears 42—44.

Figures 5, 6, 7, 8:
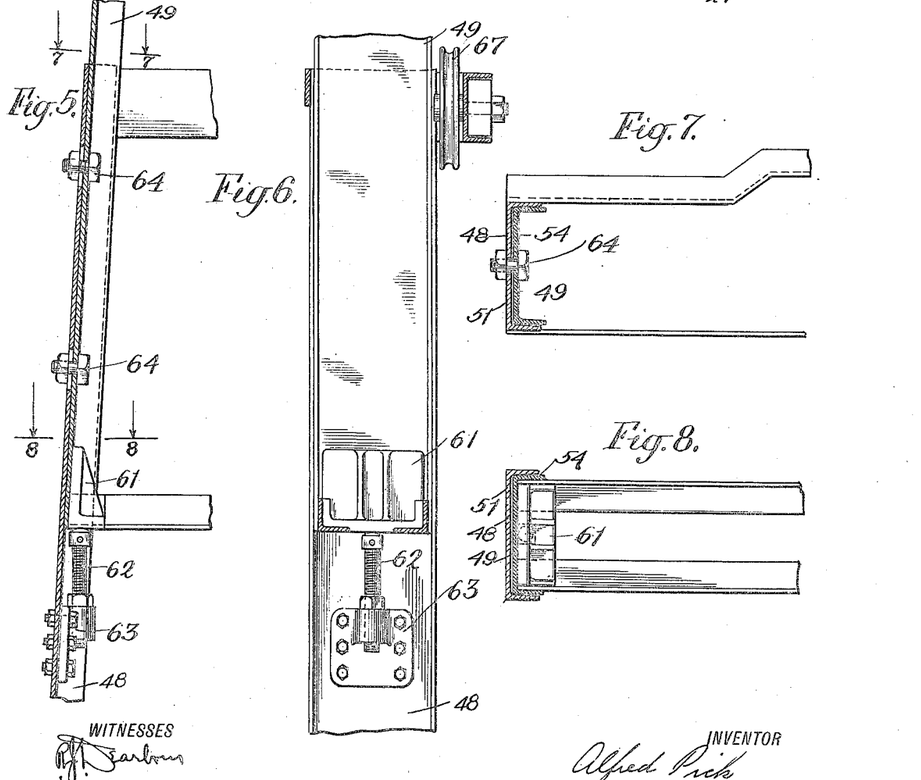
Figure 9:
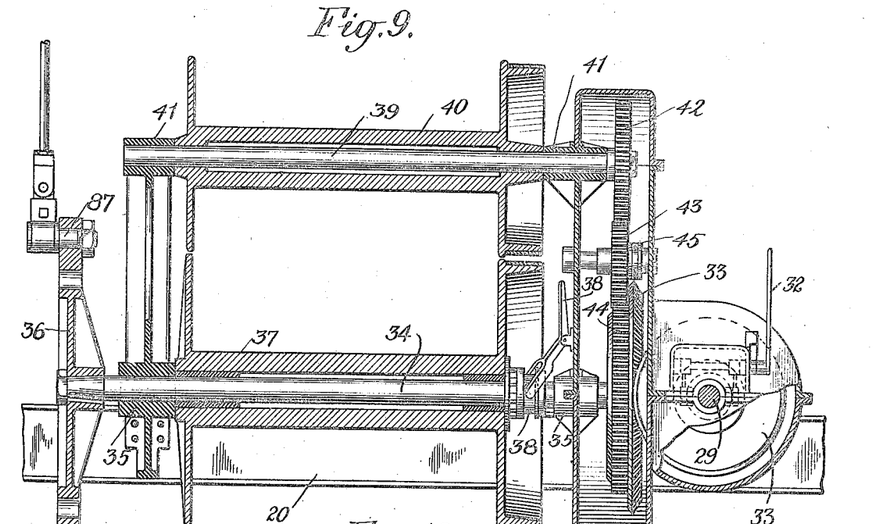
Fig. 9 is a longitudinal sectional elevation through the forward part of the vehicle showing the reel drums and the drilling crank. A partially sectional plan view of the same parts is shown in Fig. 10.

The arrangement of connections and clutches is such that, when the main jaw clutch 32 is released and the pinions 30 are secured in position, the motor is adapted to drive the vehicle in the ordinary manner, the transmission gears being utilized to change the speed and the drilling apparatus being entirely disconnected. When it is desired to use the drilling apparatus, the pinions 30 are removed as above indicated and the clutch 32 set, thereby operatively connecting the motor through the friction clutch 26 and the transmission gears to the forward longitudinal shaft section 34. The drilling crank is now operated and either of the reels 37 and 40 may be operated according as the clutch 38 or idler 45 is set. The operation of the drilling machine is governed just as the vehicle is governed in operation, that is, by means of the engine, the main clutch 26 and the transmission gears. Mounted in guide brackets 45ª near the front end of the vehicle are a pair of uprights 46, which support at their upper ends trunnions 47 extending from opposite sides of the lower section 48 of the mast. In addition to the lower section 48 the mast comprises an intermediate section 49 and top section 50. The section 48 comprises a pair of side channels 51 having interconnecting cross stays 52, and a pair of horizontal I beams 53 near its lower end. Cross stays 52 are disposed so as not to interfere with the telescoping of the sections, the intermediate section 49 being constructed of side channels 54 which are slightly smaller than, and are adapted to nest with the channels 51 as clearly shown in Fig. 7. Since the sides of the mast taper (being relatively close together at the top) the sections are adapted to fit one into the other when the mast is fully extended but fall freely one within the other when the mast is collapsed. The top section 50 is similar in construction to the lower sections and has side channels 55 which are slightly smaller than the sections 54.

Mounted near the upper end of the lower section is a drilling sheave 56 which is adapted to be longitudinally adjusted and fixed in any suitable position on a shaft 57. The shaft is rotatably mounted in bearings 58 which are in the form of brackets and are pivotally suspended from stationary fixtures 59 respectively secured to the channels 51. The bearings have flange projections 60 which are adapted to be bolted or otherwise detachably secured to the same channels, the arrangement being such that the flanges 60 may be detached and the sheave with its shaft swung out of the plane of the mast for the purpose of permitting the mast sections to be telescoped.

Secured to the lower corners of the intermediate section 49 are blocks 61; and elevating jack screws 62, which coöperate with blocks or nuts 63, which are removably secured to the channels 51 of the lower section, the arrangement being such that when the intermediate section is raised almost into its locking position with the lower section, the elevating jack screws may be placed in position and act against the blocks 61 in forcing the intermediate section firmly into place.

When once the sections are in position they are secured by bolts 64.

The top section is provided with a sand line reel pulley 65 and a crown pulley 66. The bottom section of the mast is furthermore provided with a pulley or sheave 67 which is utilized in raising the mast after it has been swung to an upright position. Near the front corners of the frame 20 are downwardly extending brackets 20$^a$ which support pulleys 21$^a$. These pulleys act as guides for ropes or cables which are utilized for swinging the mast to an upright position and extend from the bottom ends of the mast channels, under the pulleys and onto the hoisting drums 31$^b$.

The arms 46 permit the mast when collapsed to be swung into a horizontal position over the vehicle and rest on a brace 68 directly over the fuel tank 24 as shown in dotted lines in Fig. 1. The portable derrick including the structure of the mast constitutes the subject matter of a divisional application, Serial No. 30,496 filed May 26, 1915.

Figures 13, 14, 15, 16:
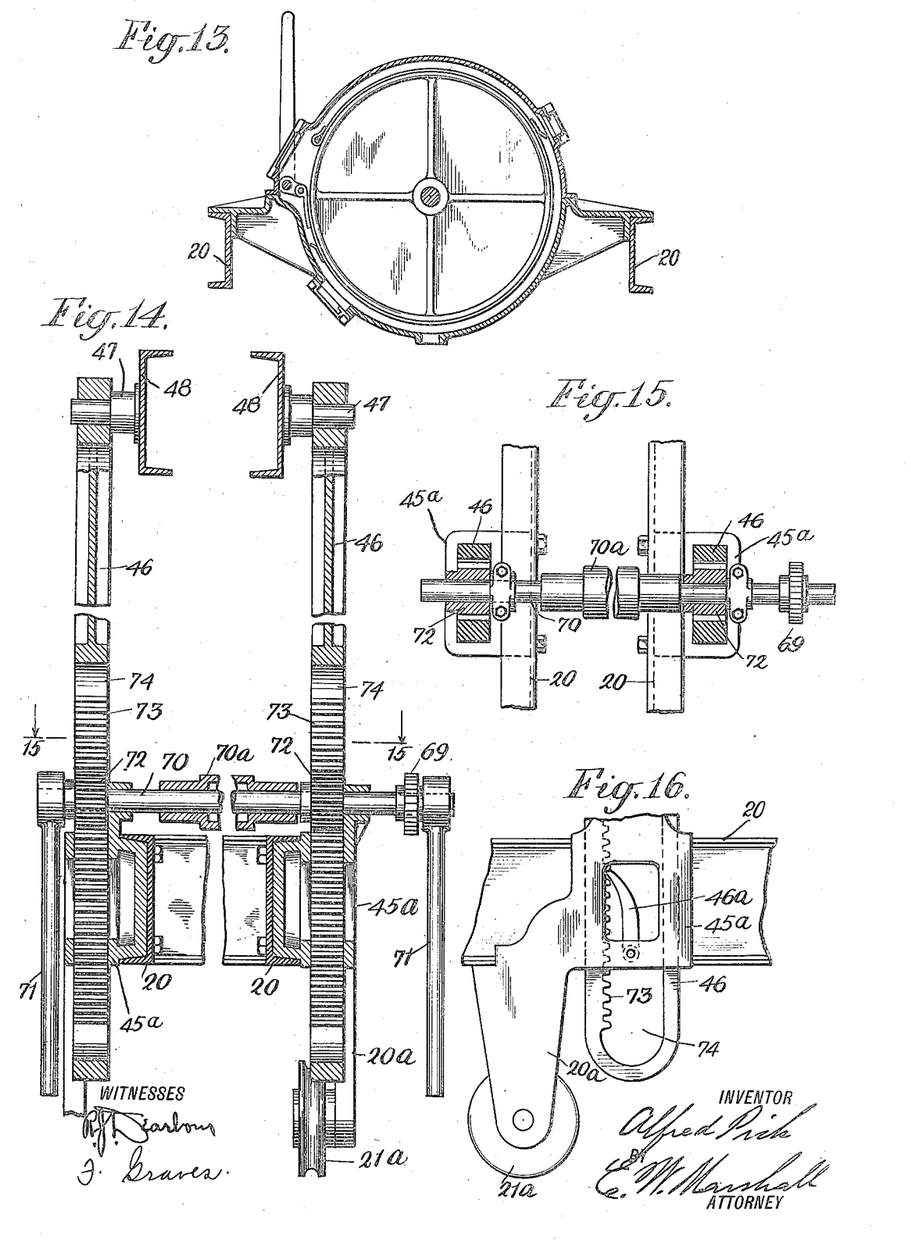

The vehicle frame is provided with a shaft 70 as shown in Figs. 14 and 15 which extends through slots 74 in the arms 46 and has a pair of pinions 72 near the respective ends. The pinions 72 mesh with racks 73 formed in the slots 74 and beyond each pinion is an actuating lever 71 which is connected to the shaft by a ratchet and pawl 69. The arrangement of parts is such that by turning the shaft the mast may be lowered until it reaches the ground. Pivotally mounted in the brackets 45$^a$ which are hollow, are pawls 46$^a$ which are adapted to engage the teeth of the racks 73 and hold the arms 46 in any position to which they may be adjusted. Secured to the shaft 70 is a hand winch drum 70$^a$ which is utilized for handling drilling bits as for example when a bit is removed and repointed or replaced by a sharp bit.

The drilling crank 36 comprises a head having a plurality of radially spaced holes into one of which a crank pin 87 is inserted, the hole selected being dependent upon the stroke desired.

Figure 10:
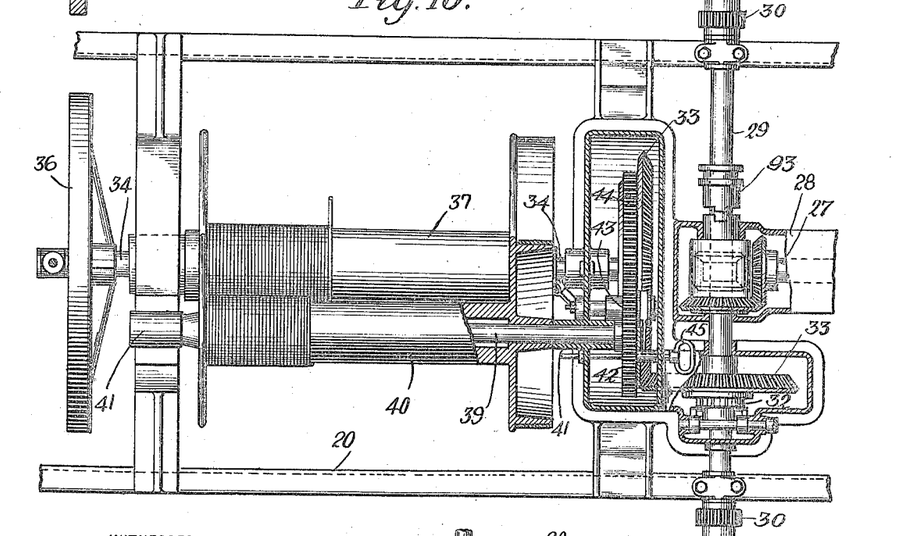
Figure 11:
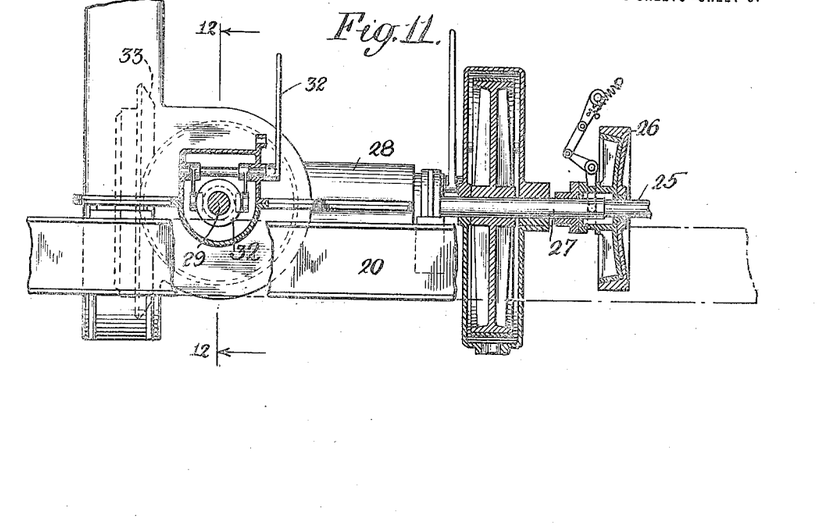
Fig. 11 is a partially sectional elevation through the intermediate portion of the vehicle showing the service brake and the main clutch which are at one end of the transmission case and the main vehicle driving shaft which is at the opposite end of the transmission case.
Figure 12:
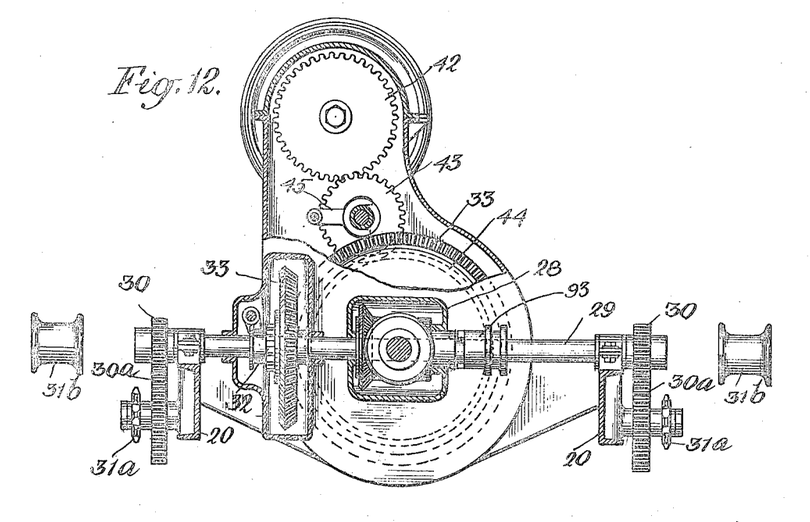
Fig. 12 is a transverse sectional elevation on the line 12—12 of Fig. 11. A transverse sectional view of the service brake is shown in Fig. 13.

As clearly shown in Figs. 10 and 12 differential gearing having means to lock the differential is utilized. The lock shown at 93, when set, locks the differential so that it cannot act for its intended purpose. It may be adjusted at will and has a number of important advantages some of which may be illustrated as follows: When the vehicle is touring on the road the differential is operative for well known reasons, but if one wheel should slip in the mud the other will stall and render progress impossible unless the differential is locked. When the engine is driving the drilling mechanism, which is coupled to only one shaft section, the differential is locked, but on the other hand when the mast is being lowered or raised by the two hoisting drums 31$^b$, the differential action is desirable to equalize the pulls on the cables or ropes. The engine is furthermore provided with two admission passages 95 and 96, one having a carbureter 97 and being connected to the engine fuel tank 24, and the other being adapted to be directly connected to a gas main or other available source of gaseous fuel (not shown). A lever 98 is conveniently located so that it may be readily shifted by the attendant to select one of the admission passages according to the character of the fuel available.

Figure 2:
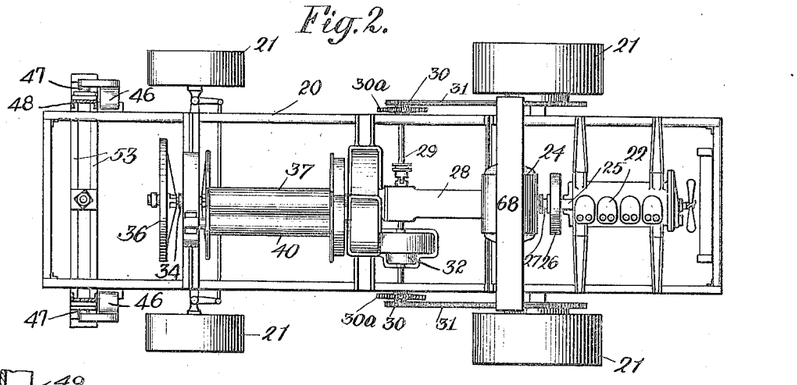
Fig. 2 is a plan view of the machine shown in Fig. 1, with the mast broken away and shown in section.
Figure 3:
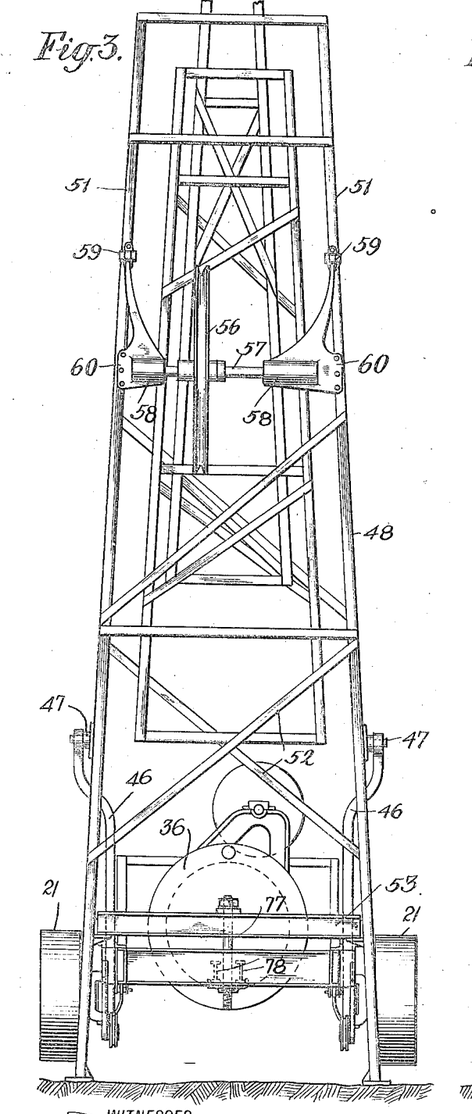
Fig. 3 is a front elevation of the same machine with the mast partially collapsed, Figs. 2 and 3 being drawn to larger scales than that of Fig. 1.
Figure 4:
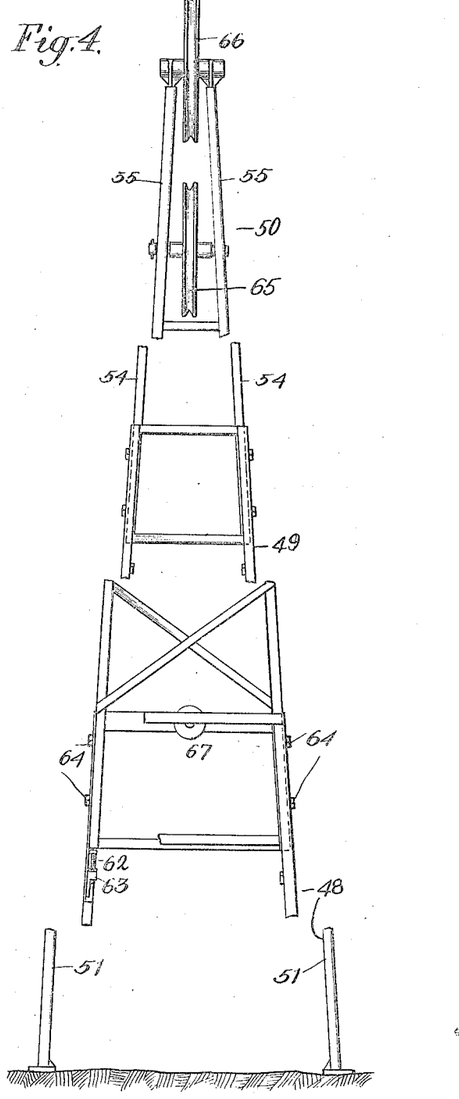
Fig. 4 is a view illustrating the top of the mast and the joints between mast sections, the intermediate portions being broken away. Details of the mast are shown on a still larger scale in Figs. 5, 6, 7, and 8, Figs. 7 and 8 being sectional views taken on the lines 7—7 and 8—8 of Fig. 5.

The machine is utilized as follows: Assuming that the vehicle is in running condition with the wheels 21 on the roadway, the pinions 30 in position as shown in Fig. 2, the clutch 32 released to disconnect the drilling apparatus, and the tower collapsed as shown in Fig. 3 and swung into the position shown in dotted lines in Fig. 1,—the vehicle is mobile and may be operated as any motor truck to a new field where it is desired to drill. When the desired location is reached the pinions 30 are first removed to disconnect the shaft 29 from the traction wheels, then the small hoisting drums 31$^b$ are mounted in place of the pinions. Next the mast is elevated by being swung about the trunnions 47 as pivots into a substantially upright position, as shown in Fig. 3. The bottom ends of the mast channels are now a short distance above the ground and the levers 71 are used for lowering the mast step by step, the pawls 46$^a$ holding the mast at each step until a new hold is secured on the shaft 70 by the levers 71 which act as ratchet wrenches. When the mast is set in position and the front end of the truck is raised thus resting on the mast, it is braced relative to the vehicle frame by means of braces 75 (see Fig. 1). The elevation of the mast is accomplished as hereinbefore set forth by attaching ropes or cables to the bottom ends of the side beams, passing them under the guide pulleys 21ᵃ and winding them on the drums 31ᵇ which are operated by the engine. The differential gearing is active and serves under these conditions to equalize the pulls on the ropes. Ropes or cables from the drums 31ᵇ are next passed under the pulleys 21ᵃ and over the sheave 67 and are hooked onto the lower end of the top section of the mast which is next raised by operating the engine until it is possible to place the elevating blocks 63 and jack screws 62 in position on the intermediate section, below the bottom end of the top section. By turning the screws 62 the top section is forced into place as already set forth and the two sections are then bolted together. The top and intermediate sections are now elevated together, the ropes being passed over the sheaves 67 and hooked onto the lower end of the intermediate section. The extended mast is secured loosely by guy cables or wires 76. The front end of the vehicle is next raised off the ground by means of a screw 77, the crank shaft 70 being adjusted longitudinally to free the pinions 72 from the racks 73. The screw 77 is attached to the cross-beam 53 of the mast and extends between the cross-stays 78 forming parts of the vehicle frame. The rear of the vehicle is jacked up and is supported by blocks 80 and 81 in such position and at such angle that the common tangent of the crown pulley 66 and the drilling sheave 56 is vertical. The apparatus is now in the position shown in Fig. 1 and the guy cables or wires 76 may be tightened. When the shaft 70 is freed as above indicated the hand winch drum 70ᵃ is available for use in handling the drill and for like purposes.

Attention is directed to the fact that the axis of the drilling crank is radial relative to the hole being drilled and in consequence the crank can be and is located close to the mast at the point where the frame of the machine is attached thereto, while the greater part of the weight of the machine is at a distance from said point of attachment. This arrangement very materially reduces shaking and vibration of the machine since the crank which tends to vibrate the machine about the point of attachment to the mast has small leverage while the weight which opposes the vibration has a relatively great leverage.

Figure 17:
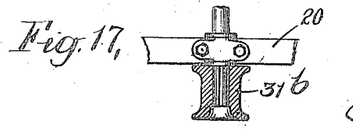

The tool used in drilling is very long and consequently the first part of the drilling operation which is called "spudding" is performed by suspending the tool from the crown pulley 66. In order that the sheave 56 may not interfere with the operation of the tool it is adjusted longitudinally of the shaft 57 on which it is mounted, out of the path of the tool. The main drilling cable 82 which is secured to the tool at one end and extends over the crown pulley 66, has its opposite end wound on the bull wheel 37. During the spudding operation slack is drawn from the bull wheel and the cable is clamped to the spudding attachment shown in Fig. 17. This attachment comprises a clamp 100 having a removable nut 101 in the form of a yoke, and a clamping screw 102 having a hand wheel 103 forming a part of it. The motor is operated and the clutches 26 and 32 set, thereby driving the drilling crank by the engine. The speed of the drilling crank may be governed just as the vehicle speed is ordinarily controlled by means of the transmission gears, and the engine, the stopping and starting being readily governed by the friction clutch 26. During the spudding operation the drill is fed forward by temporarily loosening the clamp which grips the cable 82.

The driller operates the hand wheel 103 of the spudding attachment to release the clamp for a very short time just at or before the time when the drilling crank tends to lift the drill. In this way a little cable is pulled through the cable clamp and the tool is advanced. When this spudding process has been completed and the drill advanced until it is entirely below the surface of the ground, the machine is stopped, the cable 82 disconnected from the crank and a drilling cable section 83, which extends over the sheave 56 securely connected to the drilling crank. The opposite end of this relatively short cable is provided with a hook 84 from which a temper screw 85 is suspended. In the further operation of the apparatus this screw is used in the usual way for feeding the tool. The tool is still connected to the main cable 82 but this cable is connected to the lower end of the temper screw in a well known manner, sufficient slack being left above to permit the drilling operation to continue, the cable being paid off from the bull wheel as needed. When the temper screw has been extended to its full length, the cable is disconnected from its lower end. The temper screw is then returned to its retracted position and the clamp reset.

When it is desired to clean the hole the clamp is released and power applied to the bull wheel by closing the clutch 38 so that the motor is thus utilized for raising the tool. The sand line extends over the sheave 65 and when not in use may be hooked onto an eye 86. Its opposite end is wound on a sand line reel 40. When the drill is lifted out of the hole a bailing tool or bucket is suspended from the sand line and is lowered into the hole in the usual way, the sand line reel being operated by setting the clutch 45 and varying its speed, etc., in the usual way, by means of the transmission gears.

The mast is only slightly inclined to the perpendicular when in drilling position and attention is particularly directed to the fact that a material portion of the weight of the entire machine is supported by the mast. By this means great rigidity is imparted to the whole structure, particularly in view of the fact that the frame which is very rugged in construction, is secured by the braces 75 to the lower section of the mast.

Since the axes of the bull wheel and the sand line reel, as well as that of the drilling crank shaft, are parallel to the motor shaft, the connections are established with a minimum of complication while by the simple expedient of jacking up the machine to an inclined position the drilling cable and sand line reel cable are maintained substantially at right angles to the axes of the reels on which they are wound. As already pointed out the drilling crank is located close to the point of attachment of the frame to the mast and consequently the depth of the hole which can be drilled by the machine depends not upon the weight of the machine but largely upon the strength of the mast, between the drilling sheave and the ground, on which the mast securely rests.

While I consider the arrangement illustrated particularly desirable, a drilling beam may be employed in lieu of the drilling crank within the scope of my invention.

What I claim is:

1. A drilling machine comprising a frame having a motor and a drilling crank mounted thereon, winding reels, means for operatively connecting the motor to the crank and winding reels and a collapsible mast adapted to form a support for the frame.

2. A drilling machine comprising a portable frame having a drilling crank, a longitudinal crank shaft, a bull wheel adapted to be operatively connected to the crank shaft, a motor, interposed means for connecting the motor to the crank shaft, adjustable uprights secured to the frame and a collapsible mast pivotally mounted on the uprights and adapted to be supported in a substantially vertical position with its lower end on the ground.

3. A drilling machine comprising a portable frame having a drilling crank, a longitudinal crank shaft, a bull wheel adapted to be operatively connected to the crank shaft, a motor, interposed means for connecting the motor to the shaft, adjustable uprights secured to the frame and a collapsible mast pivotally mounted on the uprights and adapted to be supported in a substantially vertical position with its lower end on the ground, and means on the frame for supporting the mast in a substantially horizontal position when collapsed.

4. A drilling machine comprising a vehicle frame having wheels, a motor on the frame, a transverse shaft adapted to be operatively connected to the wheels, a longitudinal crank shaft, a drilling crank affixed to the crank shaft, means for operatively connecting the transverse shaft and the crank shaft, a clutch and transmission gearing interposed between the motor and the transverse shaft, uprights secured to the frame near the drilling crank and a telescopic mast pivotally supported at the upper end of the uprights.

5. A drilling machine comprising a vehicle frame having wheels, a motor on the frame, a transverse shaft adapted to be operatively connected to the wheels, a longitudinal crank shaft, a drilling crank affixed to the crank shaft, means for operatively connecting the crank shaft and the drilling shaft, and a clutch and transmission gearing interposed between the motor and the transverse shaft, uprights secured to the frame near the drilling crank, a collapsible mast having a plurality of telescoping sections of which the bottom section is pivotally mounted on the top of the uprights, and means for supporting the mast in a substantially horizontal position above the vehicle frame when collapsed.

6. A drilling machine comprising a portable frame having a drilling crank, a longitudinal crank shaft, a bull wheel adapted to be operatively connected to the crank shaft, a motor, interposed means for connecting the motor to the shaft, uprights adjustably secured to the frame, a collapsible mast pivotally mounted on the uprights, and means for adjusting the frame relative to the uprights to cause the mast to constitute a support for the frame when the mast is in a substantially vertical position.

7. A drilling machine comprising a vehicle frame having wheels, a motor on the frame, a transverse shaft adapted to be operatively connected to the wheels, a longitudinal crank shaft, a drilling crank affixed to the crank shaft, means for operatively connecting the transverse shaft and the drilling shaft, a clutch and transmission gearing interposed between the motor and the transverse shaft, uprights adjustably secured to the frame near the drilling crank, a mast pivotally supported on the uprights and means for adjusting the frame relative to the uprights to cause the mast to constitute a support for the frame when the mast is in a substantially upright position.

8. A drilling machine comprising a mobile vehicle having a propelling motor and a horizontal frame, a drilling crank adapted to be operatively connected to the propelling motor, uprights adjustably secured to the horizontal frame near one end, a mast pivotally supported at an intermediate point upon the uprights, and means for adjusting the position of the frame relative to the mast so as to lift the frame and transfer a portion of its weight from the wheels to the mast when the mast occupies a substantially vertical position.

9. A drilling machine comprising a mobile vehicle having a motor and driving wheels, a transverse driving shaft adapted to be connected thereto, a clutch and transmission gearing interposed between the motor and the transverse shaft, and a longitudinal crank shaft having a drilling crank at one end, a bull wheel, a clutch interposed between the bull wheel and the crank shaft, a sand line reel, a shifting idler between the crank shaft and sand line reel, and a clutch between the crank shaft and the transverse driving shaft whereby the driving wheels or the drilling apparatus may be operated by the motor and controlled by the main clutch and transmission gears.

10. A tractor drilling machine comprising a vehicle frame, drilling machinery mounted thereon, an engine, a driving shaft, a service brake between the engine and the driving shaft, and means for coupling the driving shaft either to the drilling machinery or to operate the vehicle, whereby the service brake is available for governing the drilling machinery as well as the operation of the vehicle.

11. A tractor drilling machine comprising a vehicle frame, drilling machinery mounted thereon, a driving engine, a transverse driving shaft adapted to be coupled either to the drilling machinery or to operate the vehicle, transmission gearing and a service clutch interposed between the engine and the driving shaft whereby the stopping and starting and the speed of operation of the drilling machinery may be governed as well as the operation of the vehicle.

12. A drilling machine comprising a frame with drilling machinery mounted thereon, a mast provided with a cable sheave, a sand line sheave and a drilling means, said mast being adapted to constitute a support for the frame.

13. A drilling machine comprising a frame, a motor and drilling machinery mounted thereon, a mast with a drilling sheave, said mast being adapted to constitute a support for the frame.

14. A drilling machine comprising a frame with a motor and drilling machinery mounted thereon, a collapsible mast pivotally mounted on the frame and adapted to constitute a support for the frame when extended and in a substantially vertical position and means for supporting the mast in a substantially horizontal position when collapsed.

15. A drilling machine comprising a mast, a frame adapted to be partially supported thereon, drilling machinery on the frame adjacent to its point of support on the mast, a drilling sheave on the mast above said point of support, and a motor on the frame at a distance from said point of support, and means for connecting the motor to drive the drilling machinery.

16. A drilling machine comprising a frame, a mast pivotally mounted thereon when not in use and adapted to be swung into a substantially vertical position and rest on the ground when in use, a motor mounted on the frame, a drilling shaft extending longitudinally of the frame and having a drilling crank near one end of the frame, means for connecting the motor to the drilling crank shaft, and winding drums mounted on the frame, said frame being adapted to be supported upon the mast, at one end near the drilling crank.

17. A tractor drilling machine comprising a vehicle frame, a drilling crank shaft extending longitudinally thereof, a drilling crank at one end of the frame on said shaft, a motor, means for coupling the motor to propel the vehicle means for coupling the motor to drive the drilling crank, and a mast pivotally mounted on said frame and adapted to be swung into a substantially vertical position with its lower end on the ground near the crank shaft when in use, and means for supporting the crank end of the vehicle frame on the mast.

18. A drilling machine comprising a motor, a frame having a drilling crank, a longitudinal crank shaft, a bull wheel, a motor adapted to drive the crank shaft and the bull wheel, uprights secured to the frame and a collapsible mast pivotally mounted on the uprights and adapted to constitute a support for the frame.

19. A drilling machine comprising a frame, drilling machinery including a drilling crank mounted on the frame, a mast adapted to constitute a support for the frame, said drilling crank being adjacent to the point of support of the frame on the mast.

In testimony whereof I have hereunto set my hand this 6th day of Novr., 1914, in the presence of two subscribing witnesses.

ALFRED PICK.

Witnesses:
E. W. MARSHALL,
WM. A. HAMILTON.